United States Patent [19]

Engledow

[11] 4,108,633

[45] Aug. 22, 1978

[54] ARC FURNACE STEELMAKING

[75] Inventor: David Engledow, Rotherham, England

[73] Assignee: British Steel Corporation, Great Britain

[21] Appl. No.: 804,744

[22] Filed: Jun. 8, 1977

[30] Foreign Application Priority Data

Jun. 14, 1976 [GB] United Kingdom ............... 24557/76

[51] Int. Cl.² ............................................... C21C 5/52
[52] U.S. Cl. ...................................................... 75/11
[58] Field of Search ........................................... 75/11

[56] References Cited

U.S. PATENT DOCUMENTS

| 3,607,247 | 9/1971 | McCoy | 75/52 |
| 4,010,026 | 3/1977 | Engledow | 75/11 |

*Primary Examiner*—P. D. Rosenberg
*Attorney, Agent, or Firm*—Bacon & Thomas

[57] ABSTRACT

A method of steelmaking in an electric arc furnace in which a ternary blend of particulate high and low carbon iron-bearing material together with fragmented scrap is continuously charged into the furnace at a rate dependent on the electrical and chemical energy reactions therein. Preferably the ternary blend is charged over only part of the steelmaking cycle, i.e. following a continuous particulate iron charge which itself follows a conventional scrap basket charge.

13 Claims, 2 Drawing Figures

ARC FURNACE STEELMAKING

This invention relates to a method of continuously charging iron-bearing materials into an electric arc furnace for steelmaking and is an improvement in or modification of the invention in U.S. Pat. No. 4,010,026.

From one aspect the present invention provides a method of steelmaking in an electric arc furnace in which a blend of particulate high carbon and low carbon iron-bearing material together with fragmented steel scrap is continuously charged into a furnace at a rate dependent on the electrical and chemical energy reactions therein.

The high carbon particulate material may be blast furnace iron in either granulated or 'pigged' form or broken plate iron of a size suitable for continuous charging or even a composite of iron powder bonded with carbonaceous material. The carbon content of the iron may typically be of the order of 4%, although lower levels of carbon are also understood to be embraced by the term 'high carbon'.

The low carbon particulate material may be directly reduced iron (sponge iron) in pelletised form, e.g. Midrex pellets. The latter conventionally have a carbon content of around 1.5% which in normal parlance would not be regarded as 'low carbon'. However this term is to be understood here to mean low 'net carbon effect', the carbon being influenced by the oxygen content as will be explained. This low carbon value in this context is to be regarded as below 1%. Millscale — carbon content typically 0.1% — may also be introduced as part of the charge.

The fragmented scrap may typically have a carbon content of between, say, 0.1% and 0.2%, and this term is to be understood to embrace 'turnings' from machining operations.

Granulated lime may additionally be charged continuously for removing sulphur and phosphorus in the usual manner, and oxygen injection is effected during the continuous charging sequence.

The ternary blend may conveniently be introduced over only part of the steelmaking cycle. In particular the charging sequence may be (1) charge scrap (2) commence melting and continuously charge granulated iron (3) continuously charge ternary blend, the constituents of the blend being in such proportions as to achieve the desired final melt analysis consistent with near optimising the aforesaid reaction levels for the furnace in question. Clearly, with this in view, stage (3) can be modified such that the ternary blend is not always utilised throughout and a unitary or binary composition can be fed to 'trim' the melt as desired.

The chief factor to consider in determining the constituents of the total charge is the carbon-to-iron unit ratio which must be at value which the furnace can adequately cope with in operation. For example to take one extreme, say, with a granulated iron charge alone — 4%C; 89% iron (total iron including metallic iron and iron content of iron oxide) the oxygen flow rate normally associated with arc furnace practice would be insufficient to effect complete decarburisation and at another extreme, say, with Midrex pellets — 1.5%C; 92% iron — the oxygen injection necessary to create and sustain the slag 'boil' to protect the side walls from the effects of radiation would lead to over-oxidation of the bath. The position is even worse with fragmented scrap (0.1% C — 96% iron).

The flexibility of the ternary blend in accordance with this invention however enables complete control to be achieved over the carbon-to-iron unit ratio so that the continuous charging technique can be applied to a wide range of carbon steels.

More particularly, whereas the parent case, U.S. Pat. No. 4,010,026 enabled a considerable increase in productivity to be achieved over the conventional all scrap charging route, in accordance with the present invention the ternary mix provides an even greater increase in productivity and complete flexibility in achieving near optimum performance. In performing this invention the excess chemical energy from the oxygen reactions associated with the granulated iron feed is diluted by the pre-reduced iron and fragmented scrap, thereby optimising the energy contribution from the electrical power source and the chemical one, from the oxidation of carbon and silicon from the granulated iron, consistent with achieving the final bath carbon and temperature conditions. Ideally, there will be no need for a separate 'refine' period at the end of the continuous charging cycle, and the use of this more complex 'mix' also enables residuals to be controlled to a large degree.

Control of residual elements, particularly copper and tin is important in the practice of electric arc furnace steel-making. For example, the blend of granulated iron (Cu content typically 0.05%) and reduced material (Cu typically 0.02%) is a particularly low residual one compared with a blend involving fragmented scrap (Cu typically 0.26%). By adopting the use of fragmented scrap in the ternary blend therefore, at the expense of either granulated iron or the reduced material, considerable flexibility is obtained in controlling residuals as well as meeting the requirements for carbon control mentioned above.

In order that the invention may be fully understood, one embodiment thereof will now be described, by way of example, with reference to the accompanying drawings, in which.

Figure 1:
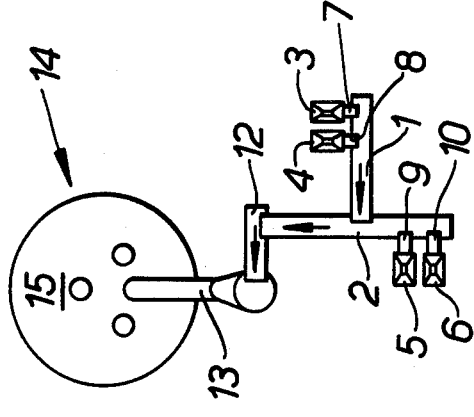
FIG. 1 is a schematic illustration of the continuous charging installation.

Referring now to FIG. 1 the installation comprises two conveyors 1 and 2 on to which are discharged fragmented scrap from a hopper 3, lime from hopper 4, granulated iron from hopper 5 and pre-reduced iron pellets from hopper 6. The fragmented scrap and lime, because of their irregular size are fed on to the conveyor 1 via constant weight feeders 7, 8, respectively, whereas the granulated iron and the pre-reduced pellets, being more regular in size, are fed on to conveyor 2 via constant rate feeders 9, 10, respectively. These weight/rate feeders have an accuracy of within 1% and feed at rates of up to 100 tonnes per hour.

The conveyor 2 having a maximum feeding rate of 140 tonnes per hour discharges on to a vibratory conveyor 12 which in turn discharges into the funnel on a gravity chute 13 through which the conveyor charge enters the furnace 14 through its roof 15.

Figure 2:
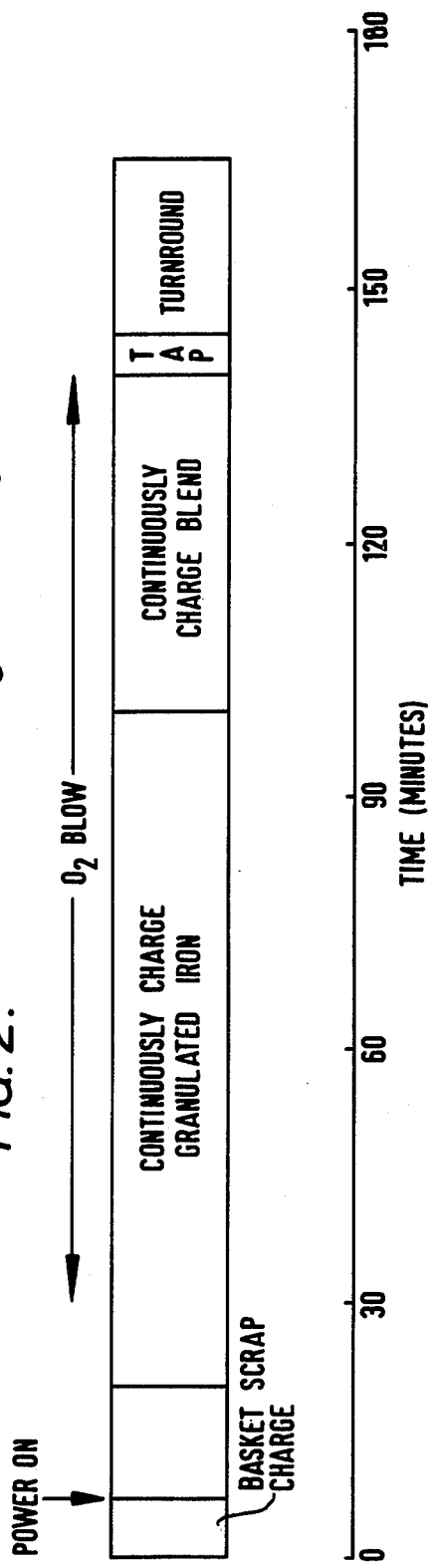
FIG. 2 is a diagram of a typical single cycle practice in accordance with this invention.

Considering now a typical charging sequence for a low carbon steel (FIG. 2), initially about 100 tonnes of scrap steel is charged into the furnace having a capacity of metallics of 190 tonnes, the roof is replaced and the arcs are struck to commence melting. About 12/13 minutes after 'power on' granulated iron is fed from its hopper into the furnace at a constant rate of say 36 tonnes per hour, together with lime, and oxygen injection commences a few minutes later. Oxygen is injected slowly at first say 500 cu./ft./min. rising towards a much greater value, say, 1500 cu.ft/min, as melting continues.

About 80 minutes later melt down is complete and a bath sample is taken. Fragmented scrap and Midrex pellets are now charged in addition to the granulated iron making up the ternary mix and this continues with the feeding rates being adjusted appropriately in dependence on the melt composition. During this period lime may also be fed for e.g. de-sulphurising. More particularly, the rate of feed is such as to maximise the utilisation of the chemical and electrical energy, the carbon input to the furnace being controlled at just the rate the oxygen supply and fume equipment can cope with whilst allowing the full and continuous operation of the transformer at an average level close to its maximum. About 30 tonnes of this blend is charged for a period of about 40 minutes and the heat is tapped about 140 minutes after commencement. Tap and turn round time accounts for another 25 minutes giving a complete tap-to-tap cycle of 165 minutes for about 170 tonnes of liquid steel.

In this example then 48 tonnes of granulated iron followed by 30 tonnes of a blend of granulated iron, Midrex pellets and fragmented scrap in a ratio of say 1:1.5:1.5 have been utilised in the heat. About one-third of the total charge therefore comprises iron and the performance, in terms of productivity, is 62 tonnes/hour.

Typical analyses of the major constituents of each part of the blend are given below, in percentages.

| Granulated Iron | | Fragmented Scrap | | | Midrex Pellets | |
|---|---|---|---|---|---|---|
| C | 4.20 | C | 0.1 | approx | C | 1.48 |
| S | 0.025 | S | 0.040 | | S | 0.012 |
| P | 0.15 | P | 0.011 | | P | 0.024 |
| Mn | 1.20 | Cu | 0.26 | | $Fe_{met}$ | 89.3 |
| Si | 1.00 | $Fe_{met}$ | 96 | | FeO | 3.5 |
| Cu | 0.05 | | | | $Fe_2O_3$ | NIL |
| $Fe_{met}$ | 89 | | | | $SiO_2$ | 1.8 |
| | | | | | CaO | 0.6 |
| | | | | | MgO | <0.2 |
| | | | | | $Al_2O_3$ | 1.0 |
| | | | | | $TiO_2$ | 0.2 |
| | | | | | Cu | 0.02 |

The Midrex pellets have a carbon content of 1.48% but this is not the value of their 'net carbon effect' which is influenced by the reaction with the oxygen in the metallics.

Thus, the oxygen content of FeO = 16/16 + 56 = 0.22%

∴ for 3.5% FeO there is 0.77% oxygen $$C + O \rightarrow CO$$

12 parts carbon react with 16 parts oxygen
∴ 0.77% O requires 0.77 × 12/16% C = 0.577% C
∴ net carbon content = 1.48 − 0.577 = 0.903% C With hematite ($Fe_2O_3$) present in the pellets as is sometimes the case then the net carbon effect will be even lower.

The oxygen content of $Fe_2O_3$ = 48/112 + 48 = 0.3%; with, say, 3% hematite = 0.9%
0.9% O requires 0.9 × 12/16% C = 0.675% C
∴ net carbon content = 1.48 − (0.577 + 0.675) = 0.23% C Practice according to this invention over a full range of carbon steels, high carbon > 0.6%, medium carbon and low carbon < 0.2%, has resulted in productivity performances of the order of the figure identified above, that is, 62 tonnes/hour which represents an improvement over the technique described in the parent case and an even more significant improvement over the conventional all scrap basket charge practice. In addition electrode consumption is reduced by as much as 20% over conventional practice. Oxygen consumption is increased, but this is as a result of the increased iron usage in the charge, e.g. about 35% with this practice compared with 16% conventionally; any increase in iron usage under conventional practice results in a significant reduction in output. There is also a slight reduction in electrical energy consumption with the practice according to this invention.

Just as with the parent case the hot-heel technique may also be adopted here, giving even greater increases in productivity than that given above.

We claim:

1. A method of steelmaking in an electric arc furnace comprising the step of continuously charging a blend of particulate iron-bearing material into said furnace, said blend comprising a first particulate of low carbon iron-bearing material having a carbon content of less than about 1% (as herein defined) a second particulate of high carbon iron-bearing material having a carbon content greater than said first particulate and less than about 4% and a third particulate different from the first and second particulates comprising fragmented steel scrap, the relative proportions of the particulates in the blend and the rate of charging of said blend in said furnace being controlled to:
  (a) maximise the utilisation of both the electrical energy supplied to said furnace and the chemical energy generated within said furnace by the charged materials; and
  (b) secure the desired carbon content of the steel on tapping said furnace.

2. A method according to claim 1, in which continuous charging is effected after melt-down of an initial scrap basket charge.

3. A method according to claim 2, in which, following melt-down of the basket charge, granulated iron is continuously charged over a period following which the said blend is charged continuously.

4. A method according to claim 3, in which lime is continuously charged additionally to the granulated iron and the blend.

5. A method according to claim 4 in which oxygen is injected during continuous charging.

6. A method according to claim 5, in which the blend of the materials is adjusted during the continuous charging period in dependence on the required carbon content on tapping.

7. A method according to claim 6, in which the high carbon particulate material is blast furnace iron.

8. A method according to claim 7, in which the high carbon particulate material additionally includes a composite bond of iron powder with a carbonaceous material.

9. A method according to claim 7, in which the low carbon particulate material is directly reduced iron pellets.

10. A method according to claim 9, in which the low carbon particulate material additionally includes mill-scale.

11. A method according to claim 9, in which a cycle is completed on tapping the furnace on completion of the continuous charging.

12. A method according to claim 9, in which a cycle is completed on tapping the furnace after a number of tappings concluding a like number of sub-cycles, continuous charging additionally being effected immediately after each said sub-cycle (except the last) on to a residue of molten metal left in the furnace after the previous tap.

13. A method of steelmaking in an electric arc furnace comprising the steps of
  (1) basket charging scrap
  (2) energising the furnace
  (3) continuously charging granulated iron over a first period
  (4) continuously charging a blend of granulated iron, pre-reduced iron pellets and fragmented steel scrap over a second period and
  (5) tapping the furnace,
oxygen being blown on to the melt during the first and second periods and lime additionally being charged, the relative proportions of the particulate material in the blend and the rate of charging into the furnace being controlled to:
  (a) maximise the utilisation of both the electrical energy supplied to said furnace and the chemical energy generated within said furnace by the charged materials; and
  (b) secure the desired carbon content of the steel on tapping said furnace.

* * * * *